United States Patent [19]

Striebig

[11] Patent Number: 5,148,732
[45] Date of Patent: Sep. 22, 1992

[54] SAW UNIT FOR A VERTICAL BOARD SAW

[75] Inventor: Ludwig Striebig, Luzern, Switzerland

[73] Assignee: Striebig AG, Littau, Switzerland

[21] Appl. No.: 693,624

[22] Filed: Apr. 30, 1991

[30] Foreign Application Priority Data

May 2, 1990 [CH] Switzerland ............ 1491/90

[51] Int. Cl.$^5$ .................. B27B 5/06; B27B 5/29
[52] U.S. Cl. ................... 83/863; 83/529;
 144/3 R; 144/471.1; 144/471.2; 144/477.1
[58] Field of Search ................... 83/863–865,
 83/471.1, 574, 471.2, 477.1, 529; 144/3 R

[56] References Cited

U.S. PATENT DOCUMENTS

| 3,122,183 | 2/1964 | Striebig . | |
| 4,058,150 | 11/1977 | Pennington | 144/1 R |
| 4,181,164 | 1/1980 | Meniconi | 144/3 R |
| 4,308,777 | 1/1982 | Lawson | 83/477.2 |
| 4,334,450 | 6/1982 | Benuzzi | 83/477.1 |
| 4,706,535 | 11/1987 | Ducharme | 83/863 |

FOREIGN PATENT DOCUMENTS 2458330 6/1976 Fed. Rep. of Germany .
3214219 9/1983 Fed. Rep. of Germany .
1601451 10/1920 France .

Primary Examiner—Hien H. Phan
Attorney, Agent, or Firm—Ralph W. Selitto, Jr.

[57] ABSTRACT

A pivotable support (11) is mounted on the drive shaft of a main sawblade (2). Located at the bottom end of the support (11) is a preslitting sawblade (22) whose drive pinion (14) can be driven via a toothed belt (18) by a drive pinion (9) sitting on the drive shaft of the main sawblade. The support (11) is held by a tension spring (19) against an adjustable stop (21) provided on the housing (1). The device can also be attached subsequently to existing vertical board saws and ensures an absolutely clean cut even on plastic-coated chipboards and when using sawblades of inferior quality.

16 Claims, 2 Drawing Sheets

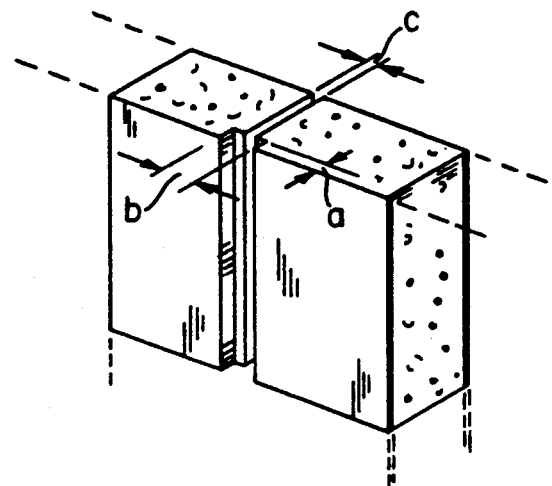
FIG. 3
FIG. 2
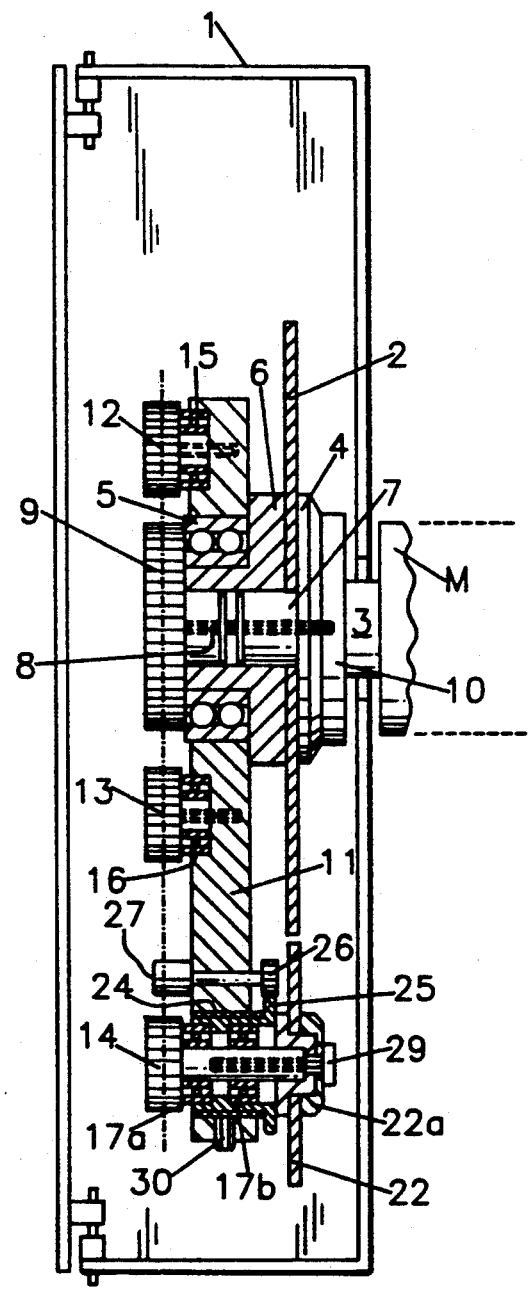

SAW UNIT FOR A VERTICAL BOARD SAW

The present invention relates to a saw unit according to the preamble of the independent patent claim.

The cutting-through of workpiece boards, such as, for example, wooden or plastic boards, by means of vertical board saws causes considerable difficulties in many cases because the edges of the cut often have a tendency to break away. On the exit side of the rotationally driven sawblade, the formation of untidy edges cannot be avoided in particular in those cases in which a tricky board material, e.g. plastic-coated chipboard, is to be cut through by means of sawblades of inferior quality.

It has therefore already been proposed to provide circular-saw benches having horizontal workpiece guidance with a so-called preslitting blade, that is, a relatively small sawblade which is likewise rotationally driven but in the opposite direction, advances in alignment ahead of the main sawblade and rough mills, so to speak, a saw track whose width generally slightly exceeds that of the main sawblade.

Whereas the attachment of such a preslitting blade to circular-saw benches having a saw unit installed in a fixed position causes no particular difficulties, the relationships in vertical board saws are much more complicated, so that hitherto no way could be found of equipping such a vertical board saw with a preslitting blade which works satisfactorily.

The conventional vertical board saw is known to have an approximately vertically disposed supporting grid on whose front face a saw beam is displaceably mounted; the saw unit, essentially a sawblade coupled to an electric motor, can be moved up and down on the saw beam and furthermore pivoted through 90°, depending on whether a vertical or horizontal cut is to be made on the workpiece. On the workpiece side, the sawblade is surrounded by a protective hood from which it partly projects; the workpiece-side front plate of this protective hood bears on the workpiece and thus determines the extent to which the sawblade can advance in the direction of the workpiece.

In the case of the preslitting blade, in contrast to the function of the main sawblade, the exact setting and subsequent constant maintenance of the penetration depth of the preslitting blade as well as the adaptability to different thicknesses of workpiece are of prime importance, and the fact that the preslitting blade could not gain acceptance hitherto in vertical board saws since it tended to jam and could not be adapted to the respective board thicknesses and tolerances can, inter alia, be attributed to this problem.

Furthermore, a further difficulty which is found in the vertical board saw in contrast to the circular-saw bench can be seen in the fact that the saw unit which can be moved up and down on the saw beam should be as compact as possible and arranged in such a way that its center of gravity lies as close to the workpiece as possible. But this situation is made more difficult by the attachment of a further preslitting sawblade advancing ahead of the main sawblade as well as by the drive of the preslitting sawblade.

For reasons of space requirements and simple manipulability of the saw unit, it is also felt to be a considerable disadvantage that no success has been achieved hitherto in taking the preslitting-blade drive from the main drive while keeping the preslitting depth absolutely constant.

It is therefore the object of the present invention to propose the attachment of a preslitting blade to a vertical board saw which requires only a single drive for the main sawblade and the preslitting blade, reliably ensures the adherence to a constant preslitting depth and enables a satisfactory quality of cut to be achieved even when using sawblades of inferior quality, the intention being for the device according to the invention also to be attachable subsequently to existing board saws in an uncomplicated manner.

This object is achieved by the combination of features defined in the defining part of the independent patent claim 1. Preferred exemplary embodiments follow from the dependent patent claims.

An exemplary embodiment of the subject-matter of the invention is described below with reference to the attached drawing.

FIG. 2 is a sectional representation of this saw unit, and

FIG. 3 illustrates the dimensions of the cut on a workpiece.

Figure 1:
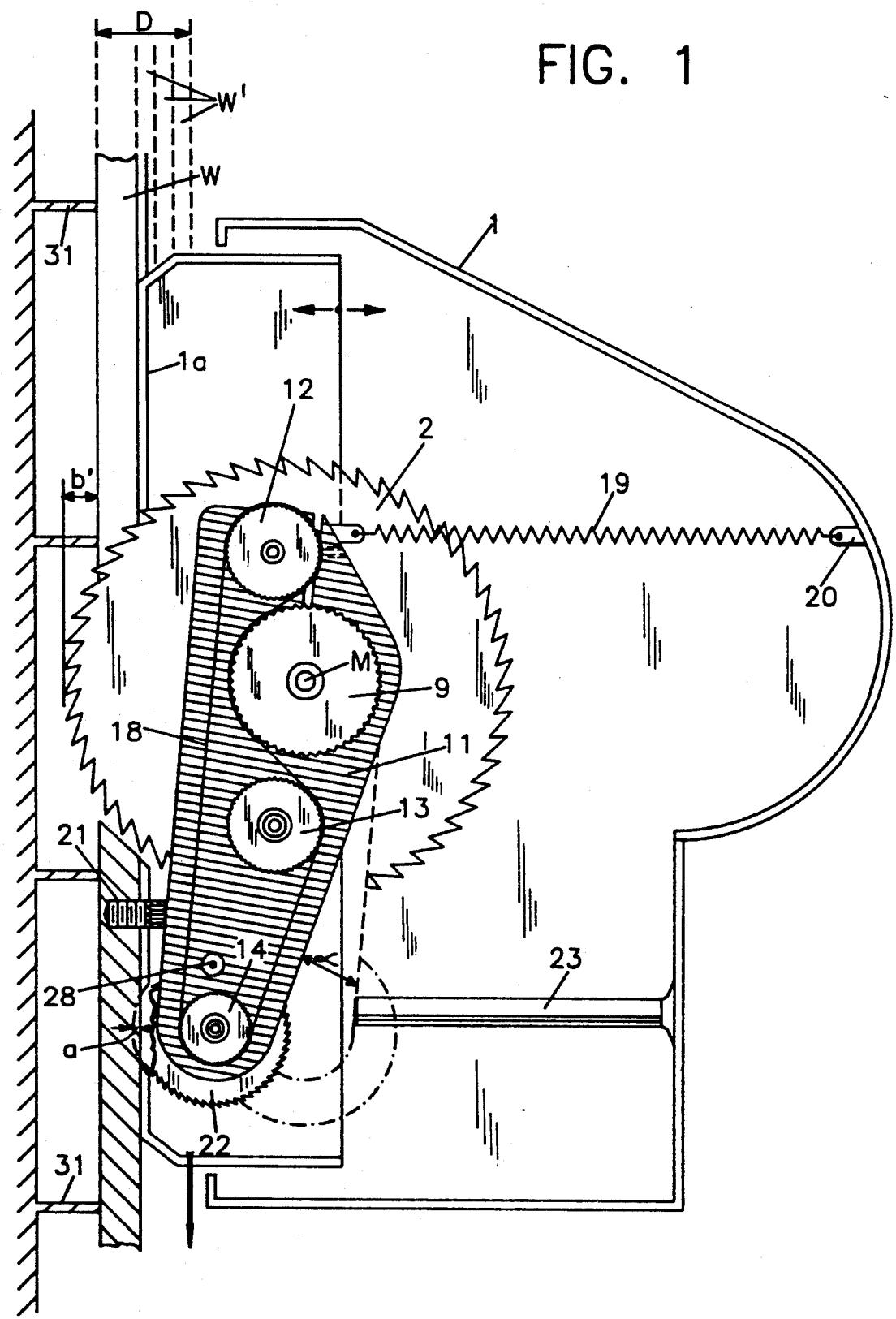
FIG. 1 is a side view of a saw unit equipped with a preslitting blade.

FIG. 1 shows the housing 1 of a saw unit which is displaceably arranged on the saw beam of a vertical board saw and whose electric motor, indicated at M, drives a main sawblade 2. The output shaft 3 of the motor M carries a clamping ring 4 connected to same in such a way as to be fixed in terms of rotation; the main sawblade 2 is clamped in place between this clamping ring 4 and a sleeve 6 rotatably mounted on a ball bearing 5. In an extension of the output shaft, a journal 7 projects into the bore of the sleeve 6, which journal 7 is connected by a central screw 10 to the journal 8 of a drive pinion 9, which journal 8 projects into the same bore. The drive pinion 9 therefore rotates with the same number of revolutions as the main sawblade 2.

Located inside the housing 1 fastened to the saw unit is a protective hood 1a which is arranged so as to be displaceable relative to the housing 1. The protective hood 1a has the task of serving as a protection against accidental contact and of preventing the spread of sawdust and dust. The protective hood must therefore always press down with slight pressure on the workpiece in order also to prevent the flapping of the workpieces during sawing. This pressure is produced by tension spring 19 via the support 11 and stop 21, which can be in the form of an adjusting screw.

Fastened to the outer ring of the ball bearing 5 is a support 11 on which two guide pinions 12 and 13 as well as a preslitting-blade drive pinion 14 are mounted in a freely rotatable manner by means of ball bearings 15, 16, 17a, 17b. An endless driving member 18 is run over the drive pinion 9 and the rest of the rotary pinions 12, 13 and 14 arranged on the support 11. The driving member 18 can be a chain or a V-belt and is, for example, designed as a toothed belt, in which case the pinions 9 and 12 to 14 have to have a corresponding tooth system.

According to FIG. 1, a tension spring 19 acts on the top part of the support 11, which tension spring 19 is anchored at the location 20 on the housing 1 and strives to rotate the support 11 clockwise about the axis of the ball bearing 5 until the workpiece-side front edge of the support 11 strikes a stop 21 arranged on the inside of the front plate 1a of the housing. The penetration depth of the preslitting sawblade 22 coupled to the drive pinion 14 in such a way as to be fixed in terms of rotation is thereby established.

The deflection of the support 11 to the side opposite the stop 21 is limited by a pin 23 fastened to the housing, so that the support 11 can be pivoted by not more than the angle alpha.

Arranged on the outer rings of the two ball bearings 17a and 17b is an adjusting sleeve 24 whose external thread meshes with an internal thread arranged in the corresponding bore of the support. Furthermore, the adjusting sleeve 24 has a collar 25 projecting radially outward, in the tooth system of which collar 25 a pinion 26 engages which in turn is firmly connected to a rotatable adjusting pin 27. The sleeve 24 can thus be axially displaced by turning the adjusting pin 27 at its hexagon socket 28 (FIG. 1). But the hub 22a of the preslitting sawblade 22 is thus also displaced, by which means the latter can be brought into an exactly aligned arrangement with regard to the main sawblade 2. The hub 22a is screwed to the stub shaft of the drive pinion 14. The sleeve 24 can be locked by a locking screw 30 after the adjustment is made.

As FIG. 3 shows with reference to a workpiece, the preslitting sawblade, which can be designed, for example, as a double blade having a variable width of cut or in one piece having teeth tapering conically outward, produces a width of cut b which preferably projects marginally on either side beyond the width of cut of the main sawblade. The dimension a designates the penetration depth of the preslitting sawblade, i.e. that dimension by which the preslitting sawblade has to project out of the front plate 1a of the housing 1.

The arrangement described ensures on the one hand that the main sawblade 11 has a constant overlap depth b' while the relative position of the protective hood 1a with regard to the housing 1 is adapted according to board thickness, and the penetration depth a of the preslitting blade 22 always remains the same. Workpiece boards of different thickness (designated by W' in FIG. 1), which are supported on the supporting strips 31, can thus be machined up to the maximum thickness D.

I claim:

1. A saw unit for a vertical board saw, comprising a housing movable vertically relative to a workpiece to be cut; a contact plate for contacting the workpiece, said contact plate being interposed between the workpiece and said housing and being movably attached to said housing such that said contact plate is movable in a first horizontal direction toward the workpiece and in a second horizontal direction away from the workpiece, whereby the position of said contact plate relative to said housing varies in response to the thickness of the workpiece; a main sawblade which is rotatable about an axis of rotation which is fixedly positioned relative to said housing such that said main sawblade extends outwardly from said contact plate; a support member which is pivotally mounted about said axis of rotation of said main sawblade such that the pivotal movement of said support member in a first arcuate direction causes a lower end of said support member to move generally in said first horizontal direction and an upper end of said support member to move generally in said second horizontal direction and such that the pivotal movement of said support member in a second arcuate direction, which is opposite to said first arcuate direction, causes said lower end of said support member to move generally in said second horizontal direction and said upper end of said support member to move generally in said first horizontal direction; a preslitting sawblade rotatably mounted on said lower end of said support member; rotating means for rotating said main sawblade about its said axis of rotation in a first rotational direction; transmitting means, mounted on said support member, for transmitting the rotation of said main sawblade to said preslitting sawblade in such a manner that said preslitting sawblade rotates in a second rotational direction, which is opposite to said first rotational direction; an adjustable stop mounted on said contact plate so as to limit the movement of said lower end of said support member in said first horizontal direction as said support member is pivoted in said first arcuate direction, whereby said stop determines the distance that said preslitting blade may extend from said contact plate; and urging means for continuously urging said lower end of said support member toward said stop, whereby the distance that said preslitting sawblade extends form said contact plate and into the workpiece remains constant regardless of the thickness of the workpiece.

2. A saw unit according to claim 1, wherein said rotating means includes a motor having a rotatable output shaft attached to said main sawblade such that said main sawblade rotates conjointly with said output shaft.

3. A saw unit according to claim 2, wherein said axis of rotation of said main sawblade is located between said upper end and said lower end of said support member.

4. A saw unit according to claim 3, wherein said contact plate is movable in said first and second horizontal directions relative to said axis of rotation of said main sawblade.

5. A saw unit according to claim 4, wherein said transmitting means includes a plurality of pinions rotatably mounted on said support member and an endless driving member trained about said pinions.

6. A saw unit according to claim 5, wherein said pinions are toothed and said endless driving member is a toothed belt.

7. A saw unit according to claim 1 or 6, wherein said urging means includes a tension spring connected between said housing and said upper end of said support member.

8. A saw unit according to claim 7, wherein said stop is an adjusting screw.

9. A saw unit according to claim 1, further comprising adjusting means, carried by said support member, for adjusting the position of said preslitting sawblade along its axis of rotation, whereby said preslitting sawblade can be aligned with said main sawblade.

10. A saw unit according to claim 9, wherein said preslitting sawblade includes a hub and wherein said adjusting means includes an adjusting sleeve attached to said hub of said preslitting sawblade and having external threads which mesh with internal threads provided in a bore of said support member.

11. A saw unit according to claim 10, wherein said adjusting means includes a rotatable adjusting pin having a pinion which is in meshed engagement with a toothed collar of said adjusting sleeve such that said adjusting sleeve rotates in response to the rotation of said adjusting pin.

12. A vertical board saw, comprising a saw unit which includes a housing movable vertically relative to a workpiece to be cut; a contact plate for contacting the workpiece, said contact plate being interposed between the workpiece and said housing and being movably attached to said housing such that said contact plate is movable in a first horizontal direction toward the workpiece and in a second horizontal direction away from the workpiece, whereby the position of said contact plate relative to said housing varies in response to the thickness of the workpiece; a support member pivotally mounted relative to said contact plate about a pivot axis located intermediate a lower end and an upper end of said support member such that the pivotal movement of said support member in a first arcuate direction causes said lower end of said support member to move generally in said first horizontal direction and said upper end of said support member to move generally in said second horizontal direction and such that the pivotal movement of said support member in a second arcuate direction, which is opposite to said first arcuate direction, causes said lower end of said support member to move generally i said second horizontal direction and said upper end of said support member to move generally in said first horizontal direction; a main sawblade mounted for rotation about said pivot axis such that said main sawblade extends outwardly from said contact plate; a preslitting sawblade rotatably mounted on said lower end of said support member; rotating means for rotating said main sawblade in a first rotational direction; transmitting means, mounted on said support member, for transmitting the rotation of said main sawblade to said preslitting sawblade in such a manner that said preslitting sawblade rotates in a second rotational direction, which is opposite to said first rotational direction; an adjustable stop mounted on said contact plate so as to limit the movement of said lower end of said support member in said first horizontal direction as said support member is pivoted in said first arcuate direction, whereby said stop determines the distance that said preslitting blade may extend from said contact plate; and urging means for continuously urging said lower end of said support member toward said stop, whereby the distance that said preslitting sawblade extends from said contact plate and into the workpiece remains constant regardless of the thickness of the workpiece.

13. A preslitting attachment for a main sawblade of a vertical board saw, comprising a support member having an upper end and a lower end; first attaching means, intermediate said upper and lower ends of said support member, for removably attaching said support member to the main sawblade such that said support member is pivotably about a rotatable drive shaft of the main sawblade; a preslitting sawblade rotatably mounted on said lower end of said support member; transmitting means for transmitting torque generated by the drive shaft of the main sawblade to said preslitting sawblade in such a manner that said preslitting sawblade rotates in a direction opposite to that of the main sawblade; and second attaching means for attaching said upper end of said support member to a pivoting means for pivoting said support member about the drive shaft of the main sawblade such that said preslitting sawblade is continuously urged toward a cutting position.

14. A preslitting attachment according to claim 13, wherein said first attaching means includes a bore provided in said support member, said bore being sized and shaped so as to receive the drive shaft of the main sawblade.

15. A preslitting attachment according to claim 13, wherein said transmitting means includes a plurality of pinions rotatably mounted on said support member and an endless driving member trained about said pinions.

16. A preslitting attachment according to claim 15, wherein said pinions are toothed and said endless driving member is a toothed belt.

* * * * *